US008769920B2

(12) United States Patent
Patterson et al.

(10) Patent No.: US 8,769,920 B2
(45) Date of Patent: Jul. 8, 2014

(54) HEADER TRANSPORT FOR A CROP HARVESTING MACHINE

(71) Applicant: MacDon Industries Ltd., Winnipeg (CA)

(72) Inventors: Roger L. Patterson, Duncan (CA); John Edward Enns, Winnipeg (CA)

(73) Assignee: MacDon Industries Ltd., Wpg MB (CA)

( * ) Notice: Subject to any disclaimer, the term of this patent is extended or adjusted under 35 U.S.C. 154(b) by 0 days.

(21) Appl. No.: 13/679,480

(22) Filed: Nov. 16, 2012

(65) Prior Publication Data
US 2013/0305677 A1    Nov. 21, 2013

Related U.S. Application Data

(63) Continuation of application No. 61/560,335, filed on Nov. 16, 2011.

(51) Int. Cl.
 *A01B 73/00*    (2006.01)
(52) U.S. Cl.
 USPC ......................................................... 56/228
(58) Field of Classification Search
 CPC ... A01D 75/002; A01D 41/16; A01D 45/021; A01B 73/005; Y10S 56/09
 USPC ....... 56/228, 208, 15.6, DIG. 9; 280/641, 769
 See application file for complete search history.

(56) References Cited

U.S. PATENT DOCUMENTS

| 3,488,930 | A | * | 1/1970 | Feldmann et al. | 56/2 |
| 3,638,407 | A | * | 2/1972 | Togami | 56/15.6 |
| 3,683,605 | A | * | 8/1972 | Jakobi | 56/228 |
| 3,919,831 | A | * | 11/1975 | Halls et al. | 56/228 |
| 4,266,391 | A | * | 5/1981 | McDuffie et al. | 56/14.5 |
| 4,280,317 | A | * | 7/1981 | Lindblom et al. | 56/15.6 |
| 4,371,299 | A | * | 2/1983 | Cain et al. | 410/44 |
| 4,384,445 | A | * | 5/1983 | McIlwain | 56/228 |
| 5,243,810 | A | * | 9/1993 | Fox et al. | 56/228 |
| 5,970,695 | A | * | 10/1999 | Dunn | 56/228 |
| 6,209,297 | B1 | * | 4/2001 | Yeomans et al. | 56/228 |
| 7,159,687 | B2 | | 1/2007 | Dunn | |
| 7,162,854 | B2 | * | 1/2007 | Yeomans et al. | 56/14.9 |
| 7,165,384 | B1 | * | 1/2007 | Wubbels et al. | 56/15.6 |
| 7,197,865 | B1 | | 4/2007 | Enns | |
| 7,347,277 | B2 | | 3/2008 | Enns | |
| 7,373,769 | B2 | | 5/2008 | Talbot | |
| 7,472,533 | B2 | | 1/2009 | Talbot | |
| 7,552,579 | B2 | * | 6/2009 | Tippery et al. | 56/228 |

(Continued)

*Primary Examiner* — Árpád Fábián-Kovács
(74) *Attorney, Agent, or Firm* — Adrian D Battison; Ade & Company Inc.

(57) ABSTRACT

A hydraulically driven swather tractor can move in a cab forward orientation in a working mode with a header on the forward end and can be rotated to engine forward in the transport position for more stable higher speed travel. A system is provided for transferring the header from field to transport position automatically from the cab and includes an arm which permanently connects to the header from the tractor independently of the lift and float mounting system such that in the working position the arm remains connected to the tractor and the header while allowing movement of the header relative to the tractor. Also in the transport position, with the header disconnected from the mounting system, the arm extends from the tractor to the mounting system of the header for supporting the forward end of the header for towing the header longitudinally.

19 Claims, 12 Drawing Sheets

(56) References Cited

U.S. PATENT DOCUMENTS

| | | |
|---|---|---|
| 7,721,830 B2 | 5/2010 | Dunn |
| 7,918,076 B2 | 4/2011 | Talbot |
| 7,926,249 B1 * | 4/2011 | Cook .............................. 56/228 |
| 7,958,706 B2 | 6/2011 | Remillard |
| 8,020,648 B2 | 9/2011 | Otto |
| 8,025,312 B1 * | 9/2011 | Honas et al. .................. 280/769 |
| 8,225,903 B2 | 7/2012 | Dunn |
| 8,245,489 B2 | 8/2012 | Talbot |
| 8,292,328 B2 * | 10/2012 | Honas et al. .................. 280/789 |
| 8,365,509 B2 * | 2/2013 | Tilly et al. ........................ 56/228 |

* cited by examiner

HEADER TRANSPORT FOR A CROP HARVESTING MACHINE

This application claims the benefit under 35 USC 119(e) of Provisional Application 61/560,335 filed Nov. 16, 2011.

This invention relates to a crop harvesting machine including a header and a tractor where the header can be moved from working position to transport position and back with little or no action by the tractor driver.

RELATED PRIOR PATENTS AND APPLICATIONS

Reference is made to the following patents and applications by the same assignee, the disclosure of each of which is incorporated herein by reference as they disclose further details which may be used in the machines disclosed herein:

U.S. Pat. No. 8,245,489 (Talbot) issued Aug. 21, 2012 which discloses a combine harvester where the header is carried on gauge wheels.

U.S. Pat. No. 8,225,903 (Dunn) issued Jul. 24 200712 which discloses a tractor of the type suitable for use herein where the tractor includes a suspension system.

U.S. Pat. No. 8,020,648 (Otto) issued Sep. 20, 2011 which discloses a tractor of the type suitable for use herein where the tractor has a rear suspension.

U.S. Pat. No. 7,958,706 (Remillard) issued Jun. 14, 2011 which discloses a tractor of the type suitable for use herein where the tractor includes a reel speed control.

U.S. Pat. No. 7,918,076 (Talbot) issued Apr. 5, 2011 which discloses a header of the type suitable for use herein where the header has three sections which include a balance of lifting forces across the three sections.

U.S. Pat. No. 7,721,830 (Dunn) issued May 25, 2010 which discloses a tractor of the type suitable for use herein with steering control.

U.S. Pat. No. 7,373,769 (Talbot) issued May 20, 2008 which discloses a header with a wear shield under the cutter bar.

U.S. Pat. No. 7,347,277 (Enns) issued Mar. 25, 2008 which discloses a header with a self-contained transport system.

U.S. Pat. No. 7,472,533 (Talbot) issued Jan. 6 2009 which discloses a header with a cutter bar and draper with a seal between the draper and cutter bar.

U.S. Pat. No. 7,159,687 (Dunn) issued Jan. 9 2007 which discloses a tractor of the type suitable for use herein where the tractor carries a header across a front face thereof for movement across the field for forming a swath from a standing crop where the tractor can be reversed in direction for transport.

U.S. Pat. No. 7,197,865 (Enns) issued Apr. 3, 2007 which discloses a header for mounting across a front face of the tractor above for movement across the field for forming a swath from a standing crop where the header includes ground wheels movable from field positions to a transport position where the header can be turned through 90 degrees and pulled by the tractor in a longitudinal direction behind the tractor.

BACKGROUND OF THE INVENTION

This invention relates to a crop harvesting machine for harvesting standing crop where a header can be moved into a transport position.

A machine of this type generally includes a crop header for cutting a standing crop including a header frame, a cutter extending across a front cutter bar of the header frame for cutting the crop, and a transport system operable to transport the crop to a central discharge opening of the header so as to form a swath.

Typically the cutter is a sickle knife of the type described in the above patents but in some cases other types of cutter can be used. In many cases the transport device is a draper but other types of transport including augers can be used.

The machine further includes a tractor or other vehicle for carrying the header including a tractor frame having a first end and a second end, ground wheels for supporting the tractor in movement across the ground including a pair of transversely spaced first wheels at the first end, a mounting assembly at the first end of the tractor frame for supporting the header, and a lift arrangement for raising and lowering the mounting assembly.

In some cases the tractor can be a swather tractor where the first ground wheels and the mounting assembly are arranged such that the swath when discharged from the central discharge opening passes between the first ground wheels and components of the mounting assembly so as to be deposited as a swath behind the tractor. In most cases there is provided a spring float assembly connecting the header frame to the mounting assembly so as to allow floating movement of the header relative to the mounting assembly of the tractor.

SUMMARY OF THE INVENTION

According to a first aspect of the invention there is provided a crop harvesting machine comprising:

a crop header for cutting a standing crop comprising:

a cutter extending longitudinally along a front of the header for cutting the crop when the header is moved in a working direction generally at a right angle to its longitudinal direction;

a crop transport system operable for transporting the crop longitudinally of the header to a center discharge opening at or adjacent a center of the header so as to form a swath for deposit on the ground;

a swather tractor having a first end and a second end for moving the header in a working position and in a transport position, the tractor comprising:

ground wheels for supporting the tractor in movement across the ground including a pair of transversely spaced first wheels at the first end;

a mounting system at the first end of the tractor between the header and the tractor for supporting the header in the working position in front of the first end for movement in a working direction;

the mounting system and the first wheels being arranged to allow the passage of the swath from the central discharge opening between the first wheels;

the mounting system providing up and down lifting and floating movement of the header relative to the tractor;

a disconnect coupling arrangement for disconnecting the header at the mounting system from the tractor for movement of the header into the transport position;

the header including ground wheels for supporting at least part of the header at least in the transport position;

a linkage connected between the tractor and the header such that in the transport position, with the header disconnected from the tractor at the mounting system, the linkage extends from the tractor to the header for communicating motion of the tractor to the header for transportation therewith;

said linkage being connected between the tractor and the header while the header is in the working position connected to the tractor by the mounting system.

In some cases and to obtain the best advantage the tractor can be drivable in both directions with the first end forward and with the second end forward with the linkage arranged such that the header is towed behind the tractor as it moves in a direction opposite to the working direction with the first end at the rear. This allows a simple connection of the header to the tractor in the transport position since the header remains at the same end when working and when towed. However it is also possible to keep the header at the same end by pushing the header forward in the transport position. In this case it is likely that a support wheel for the outboard or forward end of the header will be steered to keep the header aligned with the front of the tractor.

In order to meet modern transport requirements over roads, it is preferable that the linkage is arranged to keep the header at a position located between a path of the first wheels as the tractor moves in a straight line, where this be towed or pushed. Of course when towed, the header will follow the tractor in the form of a trailer so that it will follow to one side as the tractor turns.

Preferably the linkage is arranged to remain permanently attached to the tractor and the header while the header is operating in the working position so that the linkage remains in place during working and transport. In this way it is properly positioned and ready to operate when the header is moved to the transport position. However it is also possible that the linkage moves into position as an initial step in the conversion from working position to transport. That is while the header remain properly supported in the working position so that it is held at a known location, the linkage is actuated to move from a stored position on the header or on the tractor into connection with the other component. In this way the header is connected to the tractor at this stage by both the mounting system and the linkage. The header is then disconnected at the mounting system leaving it connected to the tractor by the linkage which is ready to provide the transportation mode. In this way, the header is never wholly separated from the tractor so that there is no requirement for the difficult operation of re-connecting two components at undetermined locations.

In order to provide a proper transport position of the header relative to the tractor, it is preferable that in the transport position, with the header disconnected from the tractor at the mounting system, the linkage extends from the tractor to a position at or adjacent an end of the header for moving the header longitudinally of the header. However other orientations are possible where for example the header is of a smaller width.

Typically the present arrangement as defined above is concerned with sickle headers where the transport system is a draper since such headers can be as much as 45 feet in length. In this case the header should be propelled along its length since any offset or angle will take it to an operating width greater than that allowed for road use. However the present invention is not limited to headers of such a length so that smaller headers may tolerate other angles and orientations of the header relative to the tractor.

Preferably the linkage extends from a position at or adjacent the end of the header to a position beyond the end of the header in order to provide a rigid coupling between the linkage acting as a towing hitch and the header.

Preferably therefore the linkage is rigidly connected to the header such that the adjacent end of the header is supported on the tractor and such that up and down movement of an end of the linkage connected to the tractor causes up and down lifting movement of said one end of the header. In this way the header acts as a conventional two wheel trailer. However other constructions are possible and for example the linkage may connect to a steerable wheel or steerable axle.

Preferably the linkage comprises a rigid arm connected at a forward end of the arm to the header and at a rearward end to the tractor and the arm is held rigidly connected to the header by engaging into a fixed receptacle at a position spaced from its end which acts to locate a point on the arm at a fixed position on the header. Thus the forward end at the header can be a pivotal connection and the preferred rigid connection is provided by the two point connection.

Preferably the forward end of the linkage or rigid arm is connected to the header at a position spaced from the mounting system which is at or adjacent the center and is spaced from the end of the header.

Preferably the linkage is connected to the mounting system on the tractor so as to be raised and lowered relative to the tractor with the mounting system. This has the advantage that the height of the header in the transport position can be adjusted using the conventional lift system on the tractor. However the linkage may also be attached directly to another location on the tractor which may be a fixed location.

Where the linkage is attached to the mounting system, it is preferably attached adjacent a center thereof so as to be positioned at the center of the tractor for symmetrical operation.

Preferably the ground wheels on the header include at least one wheel adjacent that end of the header which is adjacent to the linkage. This wheel acts for supporting the end of the header as the header moves from the working position to the transport position. The wheel is then retracted during transport so that the end of the header is supported by the tractor through the linkage. Thus the wheel is provided only for temporary support as the movement between the two positions occurs.

Preferably movement of the header from the transport position to the working position and back which includes deployment of the ground wheels is effected automatically without movement of the linkage or ground wheels by the operator. Thus the operator can, in the embodiment described hereinafter, merely operate the switch necessary to commence the transfer of position from one to the other and then drives the tractor in the required direction to effect the forces on the header to cause the movement to occur, while the header itself is properly supported and connected at all times. The operator can therefore remain seated and merely needs to drive the tractor in the required direction. No physical movement of components is required. No guiding of the tractor into engagement with hitch couplings or the like is required since the coupling remains in place at all times during the transfer.

Preferably the mounting system includes a lift system for up and down movement and a spring float system connecting the header to the lift system so as to allow up and down and floating movement of the header relative to the tractor. Where the linkage remains in place during the working operation, the linkage is thus preferably arranged and connected such that in the working position the linkage allows the up and down movement of the header and the floating movement of the header relative to the tractor. For this purpose, one preferred arrangement for effecting this action is to connect end of the linkage to the header by a connector member at the header which allows limited side to side movement of the end of the linkage and limited twisting movement of the end of the linkage about an axis parallel to the working direction.

Preferably the spring float system includes at least one resilient spring which flexes in response to the floating movement and the spring float system includes a disconnect coupling arrangement for connection to the mounting members arranged when disconnected such that the spring float assembly including the resilient spring remains attached to the header. That is the lift system and the float system are separated into two components where one remains with the header and the other remains with the tractor. However this arrangement is not essential and the disconnection of the header from the tractor may occur at the header or at the tractor so that the whole of the mounting system remains with one or other.

In a preferred arrangement, the tractor is of the conventional type including an engine mounted on the tractor frame; at least one hydraulic pump driven by the engine for generating a source of hydraulic fluid under pressure for driving components of the tractor and components of the header when attached to the tractor; two driven wheels of the tractor mounted at the first end of the tractor; two non-driven castor wheels of the tractor mounted at the second end of the tractor and a cab mounted on the tractor frame at the first end. This is the type of tractor conventional used as a swather. However other constructions can be used.

In such conventional swather tractors there is provided an operator's seat and control assembly arranged for controlling driving movement of the tractor in both a first end forward position and in a second end forward position, the control assembly including a steering control and a speed control; wherein each of the driven wheels including a respective drive motor driven by hydraulic fluid from the at least one hydraulic pump; wherein the speed control is arranged to control a rate of supply of hydraulic fluid from the at least one hydraulic pump to the respective drive motor to control a common speed of rotation of the driven wheels and thus a speed of movement of the tractor; and wherein the steering control is arranged to control a differential in rate of supply of hydraulic fluid from the at least one hydraulic pump to the respective drive motor to control a relative speed of rotation of the driven wheels and thus a turning direction of the tractor.

Where the tractor is bi-directional, the tractor preferably includes a cab with an operator seat within the cab and wherein the operator seat is rotatable for driving the tractor in both directions with the first end forward and with the second end forward.

According to a second aspect of the invention there is provided a crop harvesting machine comprising:
 a crop header for cutting a standing crop comprising:
  a cutter extending longitudinally along a front of the header for cutting the crop when the header is moved in a working direction generally at a right angle to its longitudinal direction;
  a crop transport system operable for transporting the crop longitudinally of the header;
 a vehicle having a first end and a second end for moving the header in a working position and in a transport position, the vehicle comprising:
  ground wheels for supporting the vehicle in movement across the ground including a pair of transversely spaced first wheels at the first end;
  a mounting system at the first end of the vehicle between the header and the vehicle for supporting the header in the working position in front of the first end for movement in a working direction;
  the mounting system providing up and down lifting and floating movement of the header relative to the vehicle;
  a disconnect coupling arrangement for disconnecting the header at the mounting system from the vehicle for movement of the header into the transport position;
  the header including ground wheels for supporting at least part of the header at least in the transport position;
  a linkage connected between the vehicle and the header such that in the transport position, with the header disconnected from the vehicle at the mounting system, the linkage extends from the vehicle to the header for communicating motion of the vehicle to the header for transportation therewith;
  said linkage remaining connected between the vehicle and the header while the header is in the working position;
  wherein the linkage is arranged and connected such that in the working position the linkage allows said up and down movement of the header and said floating movement of the header relative to the vehicle.

Thus according to this aspect the present invention provides, in any configuration of a tractor or other vehicle which carries the header with a lifting and floating action, a linkage which remains permanently attached between the header and the vehicle so that the transfer between working position and transport position of the header relative to the vehicle can be effected by the permanent connection.

According to a third aspect of the invention there is provide a crop harvesting machine comprising:
 a crop header for cutting a standing crop comprising:
  a cutter extending longitudinally along a front of the header for cutting the crop when the header is moved in a working direction generally at a right angle to its longitudinal direction;
  a crop transport system operable for transporting the crop longitudinally of the header;
 a vehicle having a first end and a second end for moving the header in a working position and in a transport position, the vehicle comprising:
  ground wheels for supporting the vehicle in movement across the ground including a pair of transversely spaced first wheels at the first end;
  a mounting system at the first end of the vehicle between the header and the vehicle for supporting the header in the working position in front of the first end for movement in a working direction;
  the mounting system providing up and down lifting and floating movement of the header relative to the vehicle;
  a disconnect coupling arrangement for disconnecting the header at the mounting system from the vehicle for movement of the header into the transport position and for reconnecting the header at the mounting system for operation in the working position;
  the header including ground wheels which can be deployed for supporting at least part of the header in the transport position;
  a transport connection arranged to extend between the vehicle and the header in the transport position for communicating motion of the vehicle to the header for transportation therewith;
  wherein operation of the disconnect coupling, provision of said transport connection and deployment of the ground wheels to allow movement of the header from said transport position to said working position and back is effected automatically, that is without the operator of the vehicle being required to manually effect operation of the disconnect coupling, to manually effect provision of said transport connection or to manually effect deployment of the ground wheels.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
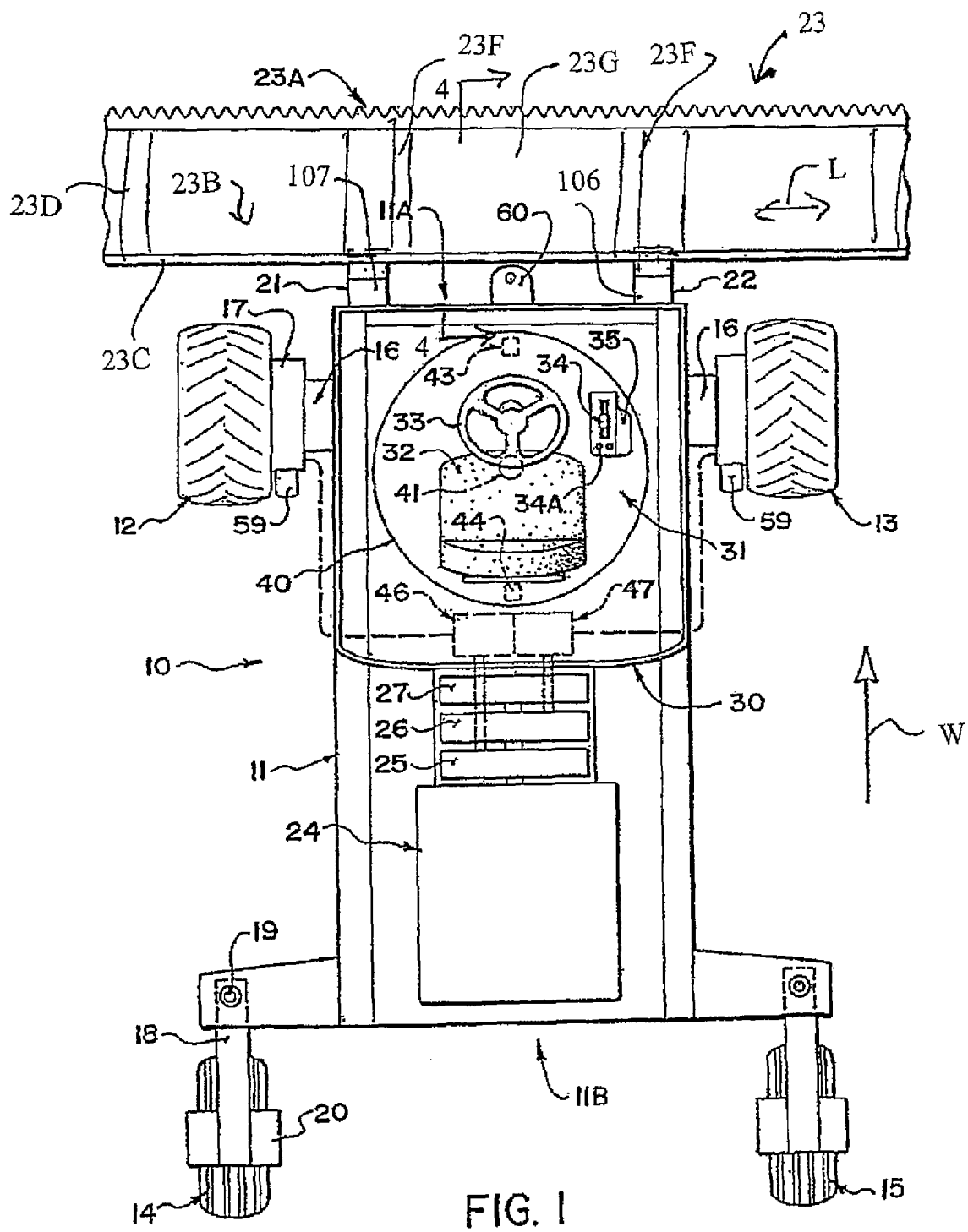
FIG. 1 is a top plan view partly in phantom and partly broken away showing a tractor according to the present invention in the cab forward position.
Figure 2:
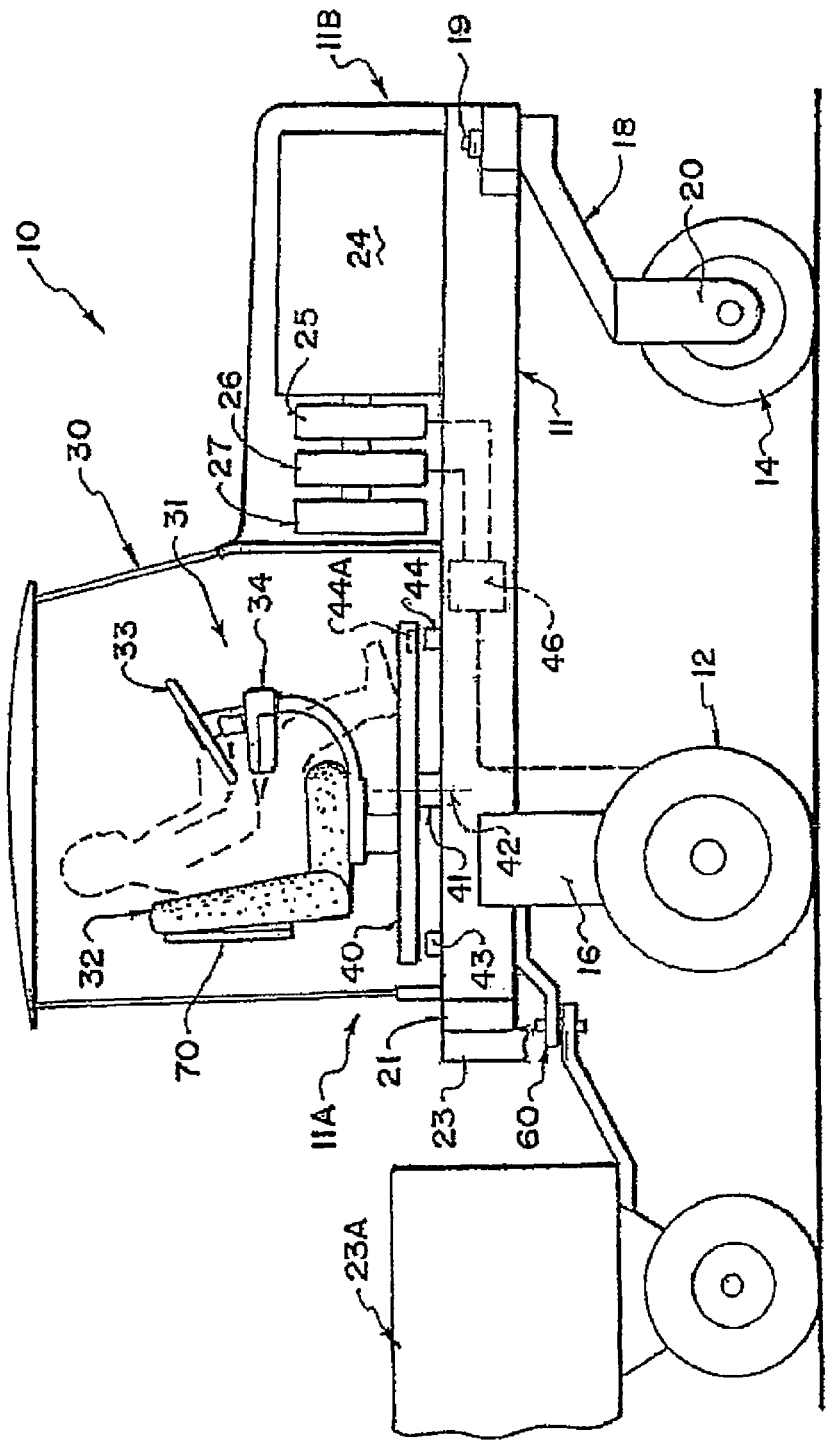
FIG. 2 is a side elevational view of the tractor of FIG. 1 in which the operator's seat and console have been rotated for operating the tractor in an engine forward position.
Figure 3:
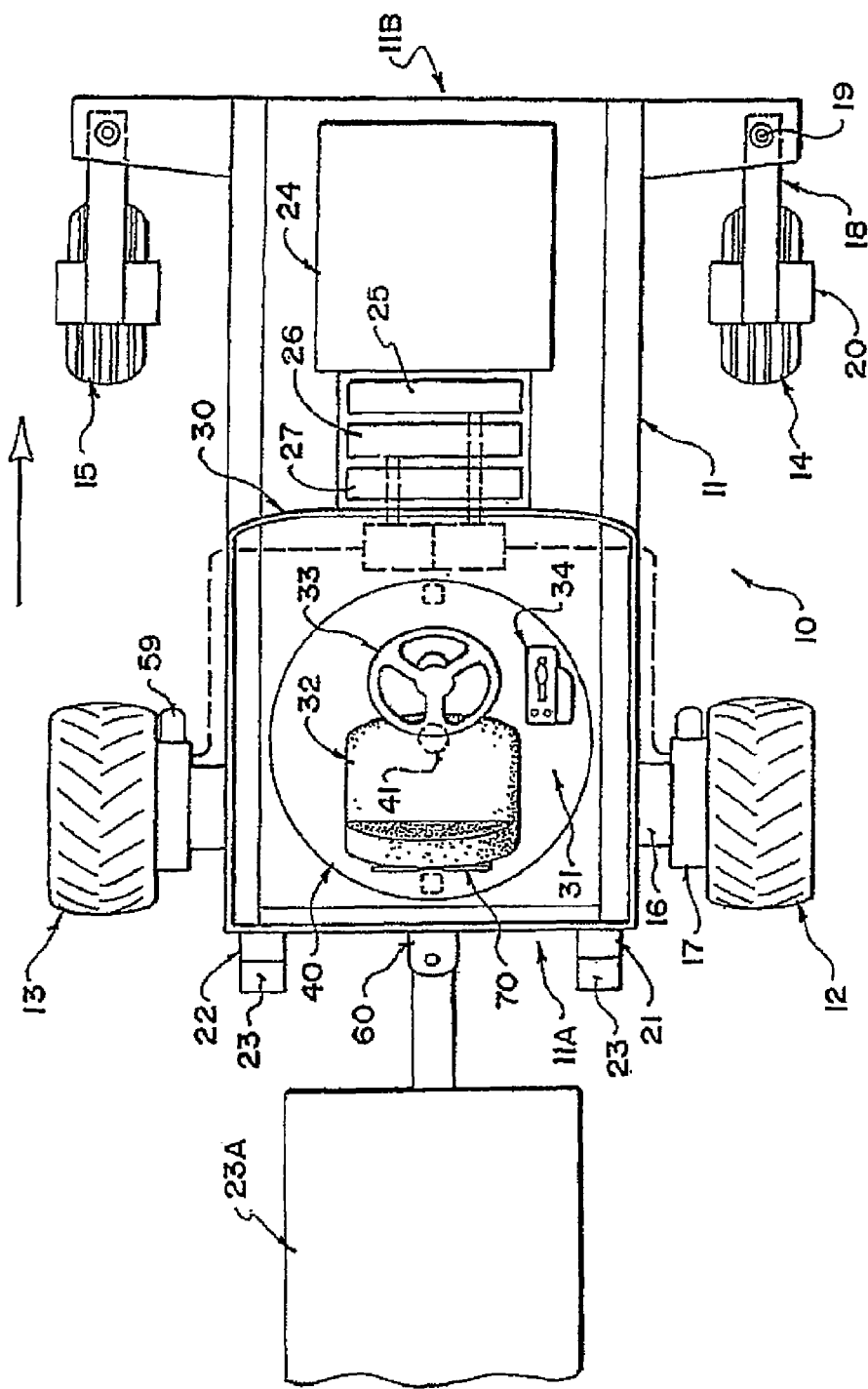
FIG. 3 is a top plan view similar to that of FIG. 1 showing the tractor in the engine forward position.
Figure 4:
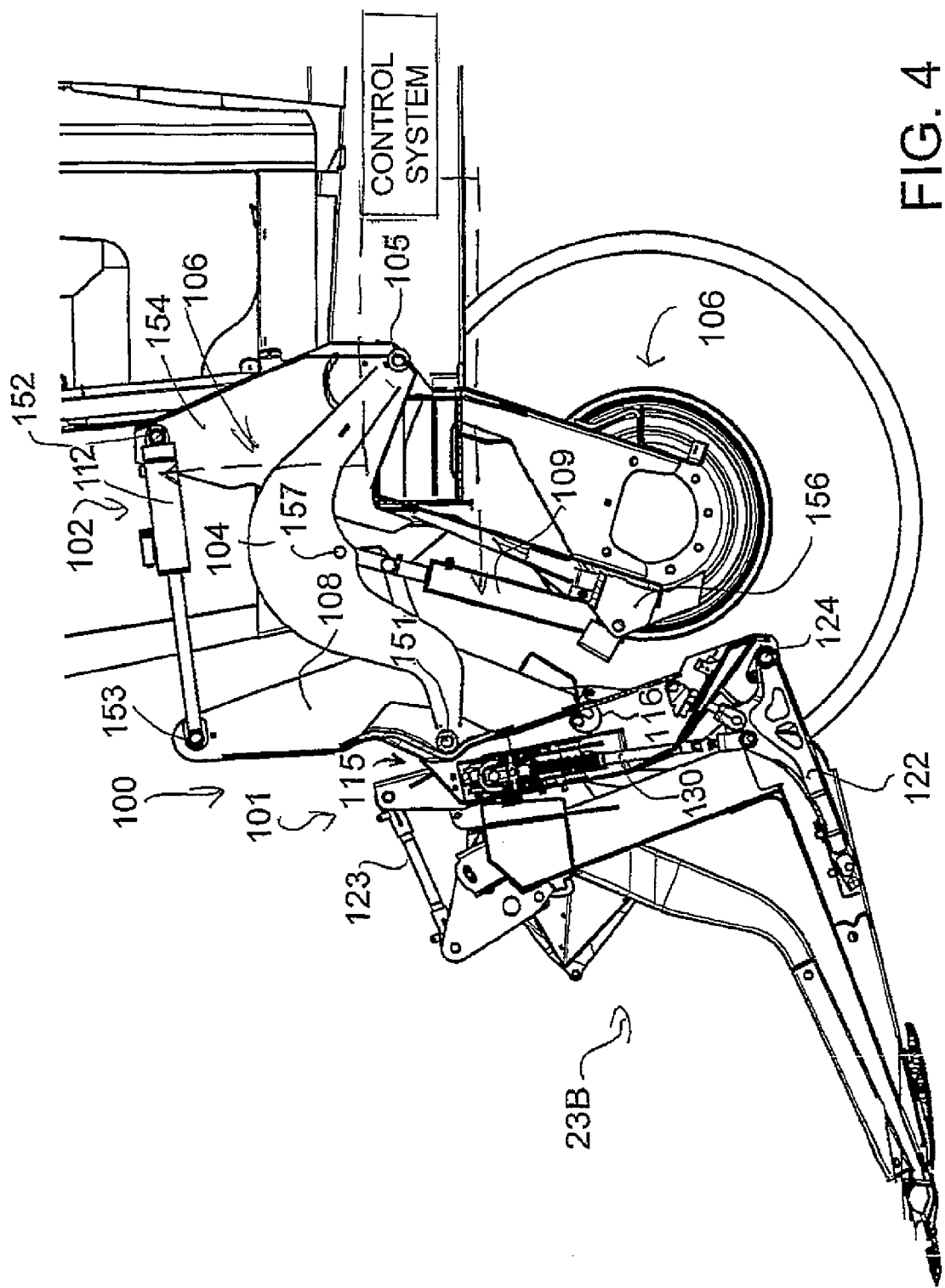
FIG. 4 is a cross-sectional view taken along the lines 4-4 of FIG. 1 showing the connection between the header and the tractor.
Figure 5:
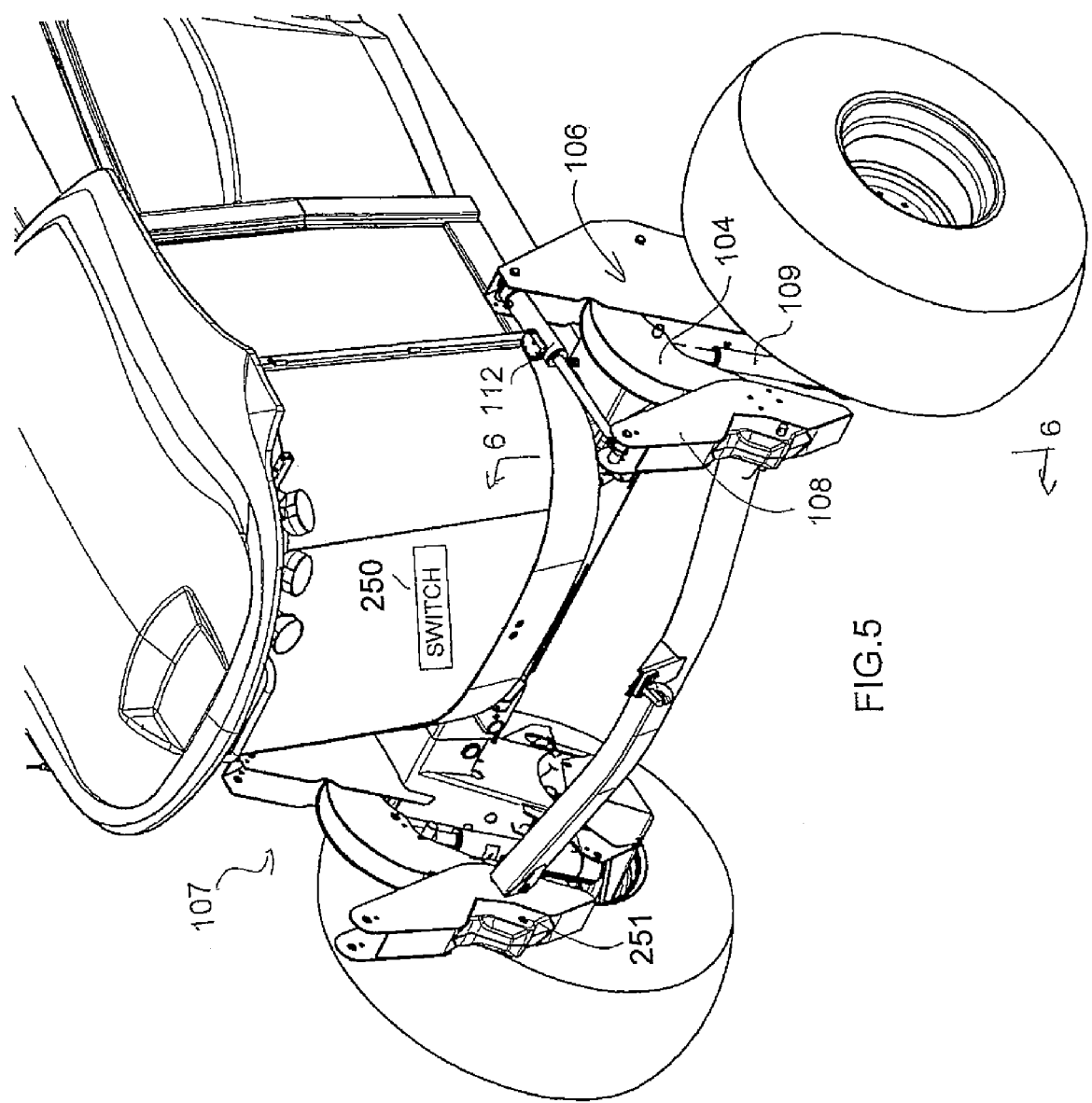
FIG. 5 is an isometric view of the tractor of FIG. 4 with the float assembly and header removed.

FIGS. 1 to 3 and the following description of the general arrangement of the tractor are taken from U.S. Pat. No. 7,159,687 defined above and are included for completeness.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch 35A, a reel height and forward location control by way of a four way (two axis) switch 35B and a reel speed control two way one axis switch 35C so that the skilled operator can control the parameters of the header during the working action. The header is engaged by a main drive control lever 35D in many cases also be reversed in the event of a blockage and thus will include a switch 35E for allowing such reversal.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIGS. 2 and 3 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

In transportation, it is intended therefore that the operator's console is moved to the engine forward position and that the tractor moves forward rapidly at high speed in the transport position at a speed significantly higher than can be achieved in current tractors of this type. When the header is of a relatively narrow width, this header can remain in place and is simply carried behind the tractor. In a situation where the header is of significant width greater than can be accommodated in a road width, the header is disconnected from the supports 21 and 22 and is instead trailed on wheels attached to a hitch 60 at the end 11A of the tractor.

Thus the tractor includes an engine 24 mounted on the tractor frame, at least one hydraulic pump 25, 26, 27 driven by the engine 24 through a transmission for generating a source of hydraulic fluid under pressure for driving components of the tractor and components of the header when attached to the tractor. In particular the hydraulic pumps generate fluid which is controlled by controls 46, 47 to supply fluid under pressure to two driven wheels 12, 13 of the tractor mounted at the first end of the tractor. Speed control and steering control; are provided by the controls 46, 47 in either direction of travel of the tractor. Two non-driven castor wheels 14, 15 of the tractor are mounted at the second end of the tractor. A cab 30 is mounted on the tractor frame at the first end.

There is provided an operator's seat 32 and control assembly 34 arranged for controlling driving movement of the tractor in both a first end forward position and in a second end forward position, the control assembly including a steering control 33 and a speed control 34. Each of the driven wheels 12, 13 includes a respective drive motor 17 driven by hydraulic fluid from the at least one hydraulic pump 25, 26 wherein the speed control 34 is arranged to control a rate of supply of hydraulic fluid from the at least one hydraulic pump to the respective drive motor to control a common speed of rotation of the driven wheels and thus a speed of movement of the tractor. The steering control 33 is arranged to control a differential in rate of supply of hydraulic fluid from the hydraulic pump to the respective drive motor 17 to control a relative speed of rotation of the driven wheels 12, 13 and thus a turning direction of the tractor.

The header 23 includes an elongate header frame 23B defined by a main beam 23C and forwardly extending legs 23D which carry a cutter bar 23A. The cutter extends longitudinally along the front cutter bar of the header frame for cutting the crop when the header is moved in a working direction W generally at a right angle to its longitudinal direction L. Different types of cutter can be used but the typical example comprises a sickle knife. A transport system 23F, generally drapers but other systems can be used, is provided for transporting the crop longitudinally of the header to a central discharge opening 23G of the header so as to form a swath to be deposited on the ground between the wheels 12, 13 of the tractor.

Many of the above components are well known and conventional and can be found in many different designs of such tractors manufactured by a number of manufacturers including the present assignee.

As shown in FIGS. 4 to 9, there is shown a modified arrangement according to the present invention for supporting the header on the tractor in front of the first end when the first end is forwards.

A mounting arrangement is provided generally indicated at 100 for supporting the header and a float assembly 101 connects the header frame 23B to the mounting system 100 so as to allow floating movement of the header relative to the tractor.

The mounting arrangement 100 comprises two symmetrical side by side mounting elements 106, 107 each arranged at a respective wheel support. Each includes an upstanding lift member 108 supported at the bottom on a bottom link 104 and at the top on a top link 102. The bottom link 104 is pivoted on the tractor at pin 105 and connects to the lift member 108 at pin 251. The top link includes an actuator 112 pivoted to the wheel assembly 154 at pin 152 and pivoted to the lift member 108 at a pin 153. The bottom link 104 extends in an arch over the frame that supports the motor and drive of the wheel of the tractor.

A lift cylinder 109 is provided for the bottom link of each element 106, 107 so that the elements can be raised and lowered as a common lift system. The lift cylinder 109 extends from the tractor wheel assembly at a mounting 156 to a pin 157 part way along the bottom link 104. Thus actuation of the lift cylinders 109 raises the lift members as a common unit for raising and lowering the mounting system for up and down movement of the header.

The top links 102 includes the a cylinder or actuator 112 arranged to change the length of the top links so as to tilt the lift members forwardly and rearwardly about the pivot pin 251. When both the lift cylinders 109 and the actuators 112 are operated, this will change the movement of the upstanding lift members 108 as a common unit from a vertical movement to a complex movement controlled by common operation of the cylinders 109 and 112. This complex movement can be controlled to tilt the header about a transverse axis longitudinal to its length as the header is raised and lowered, thus providing a complex controlled movement of the cutter bar.

The spring float assembly 101 connects the header frame 23B to the lift members 108 so as to allow floating movement of the header relative to the mounting members 106, 107 of the tractor.

The spring float assembly 101 attaches to the lift members 108 by a hook 115 which engages over a support at or adjacent the pin 251 at the upper end and by a latch 116 at the lower end. Thus the tractor moves forward to the float assembly carried on the header as part of the header. The connection as shown in FIG. 13 is tapered or triangular with a forward facing apex 117 so that as the tractor moves forward the engagement of the apex into a receptacle on the assembly 101 can move the header slightly side to side to provide the required alignment for the hook 115 and the latch 116 to be engaged. The connection can be designed in different ways to provide a top and bottom connection which holds the float assembly in position on the lift members 108 to ensure that the float assembly remains attached without risk of becoming separated. This typically requires a connection either at the hook 115 or the latch 116 which is manually inserted to ensure proper and maintained connection. The top hook 115 and the bottom latch 116 hold the spring float assembly 101 at an orientation fixed relative to the lift members 108 so that these elements can pivot as a common construction about the transverse axis at the a 251.

Figure 6:
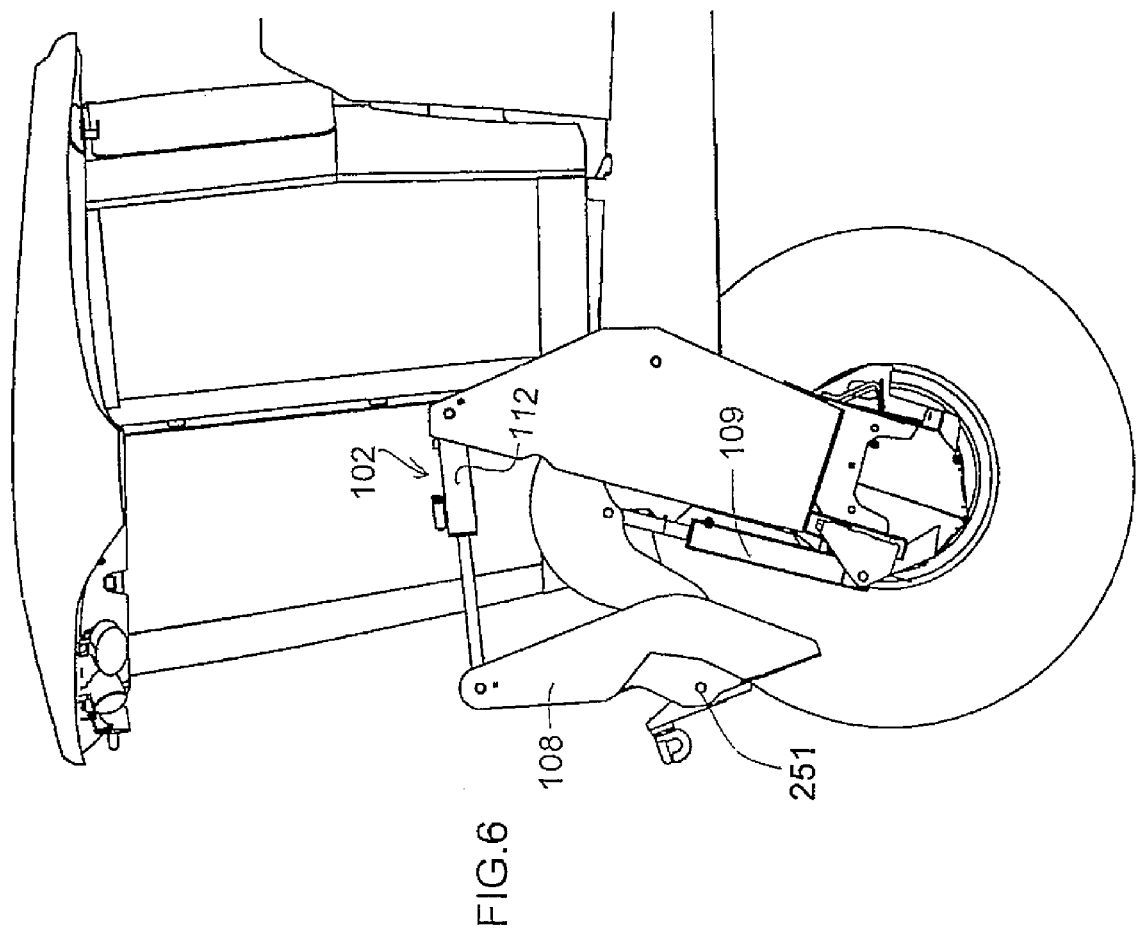
FIG. 6 is a cross-sectional view taken along the lines 6-6 of FIG. 5.
Figure 7:
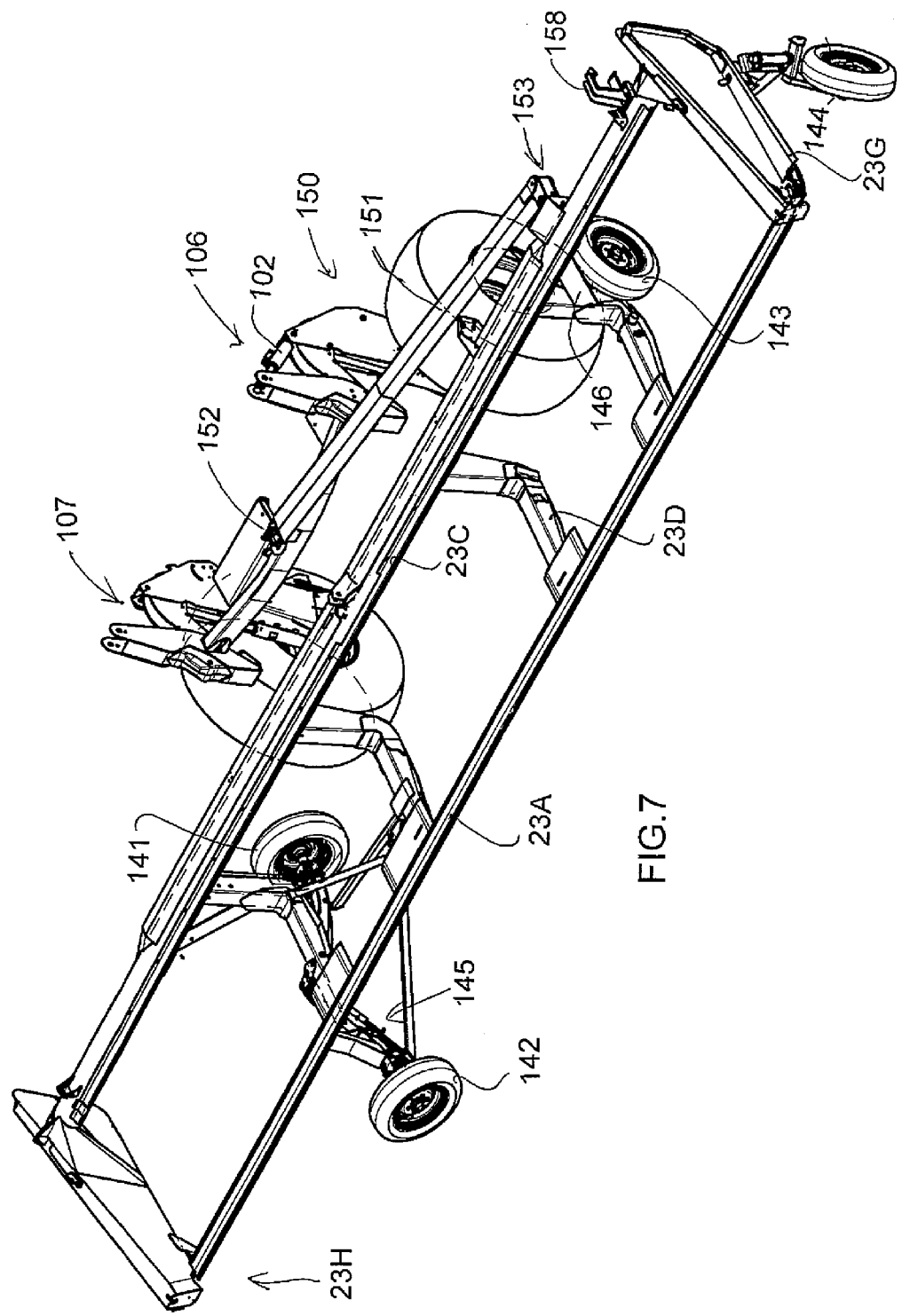
FIG. 7 is an isometric view of the tractor and header of FIG. 4 with the float assembly removed showing the header and the tractor in the operating position.
Figure 8:
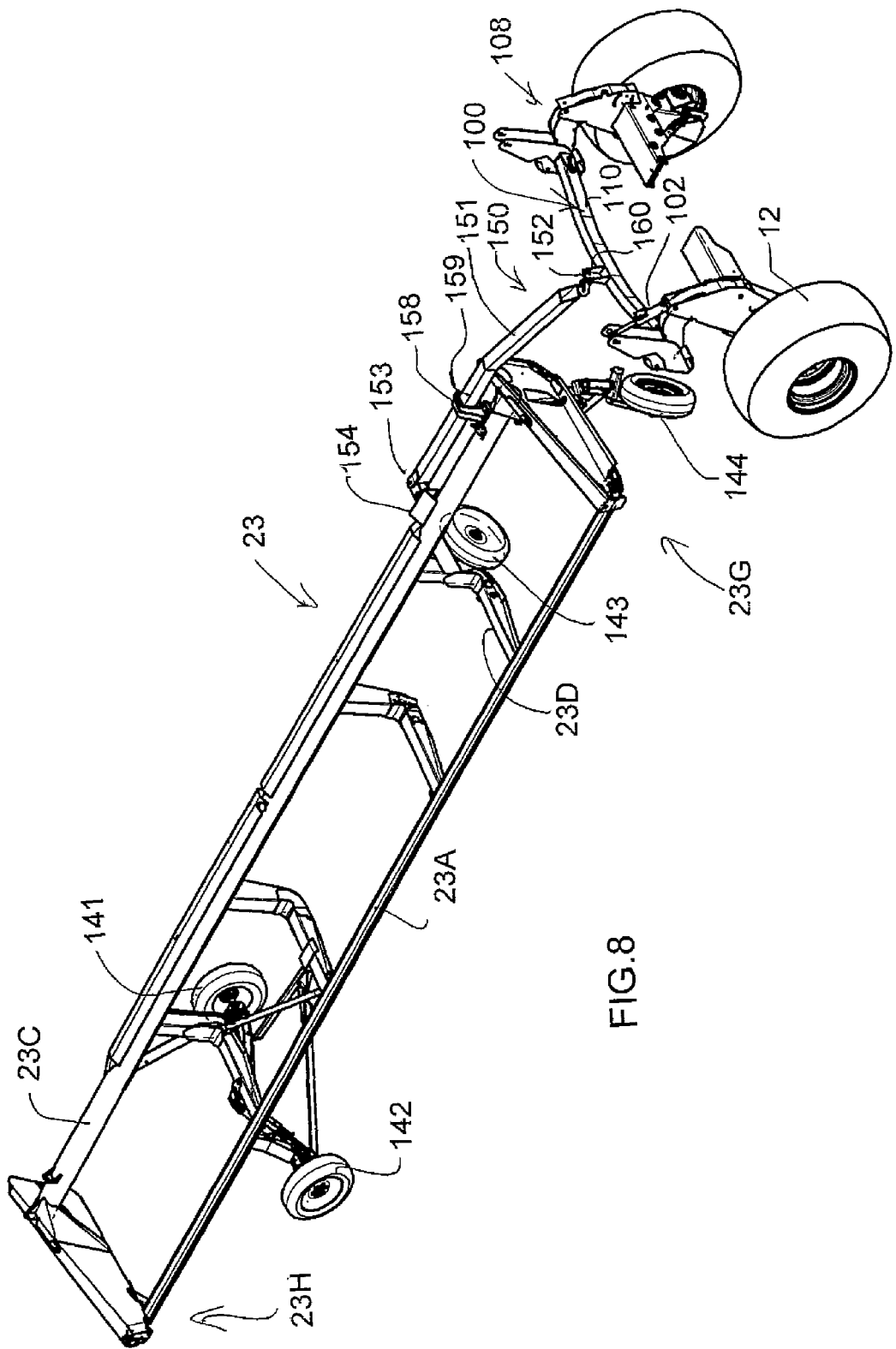
FIG. 8 is an isometric view of the tractor and header of FIG. 4 with the float assembly removed showing the header and the tractor in the transport position.

The spring float assembly is shown best in FIGS. 6, 7 and 8 as a separate element separated from its header and disconnected from the tractor. However the assembly 101 is provided as a part of the header and is intended to remain connected to the header as an integral element therewith. This allows the assembly to have its springs and lift force tailored to the individual header with which it is intended to be used. The spring float assembly thus includes the disconnect coupling arrangement defined by the hook and latch 115, 116 for connection to the mounting members arranged when disconnected such that the spring float assembly including at least one resilient spring remains attached to the header.

The assembly 101 includes a rigid frame defining a top bar 118 and two depending legs 119 and 120. The assembly is attached to the header by a pair of bottom lift levers 121 and 122 and a top single center link 123. The levers 121, 122 are pivoted at 124 at a position rearward of the legs 119, 120 and have front ends 125 which engage into respective receptacles in the frame legs 23D of the header frame. The levers 121, 122 are suspended on roller chains 126 connected to springs 127 so that an upward force is communicated to the levers 121, 122 for up and down floating movement of the header on the assembly 101. The link 123 prevents the header from tilting away from the legs but pivots at each end to allow the header to move in an arc as it floats up and down. The link 123 can be provided as an adjustable actuator, typically a hydraulic cylinder to adjust the orientation of the header but in most cases is merely a fixed link which can be manually adjustable at set up only. The single central link also allows one side to float up more than the other so that the levers 121, 122 can operate independently on independent springs 127.

The resilient mechanical coil springs 127 are under tension and stretch and retract in response to the floating movement. The springs are horizontal across the top bar 118 of the spring float assembly.

Turning now to the transport system shown in FIGS. 7 to 12, the float assembly 101 is omitted from these figures for convenience of illustration and to avoid complication.

Figure 9:
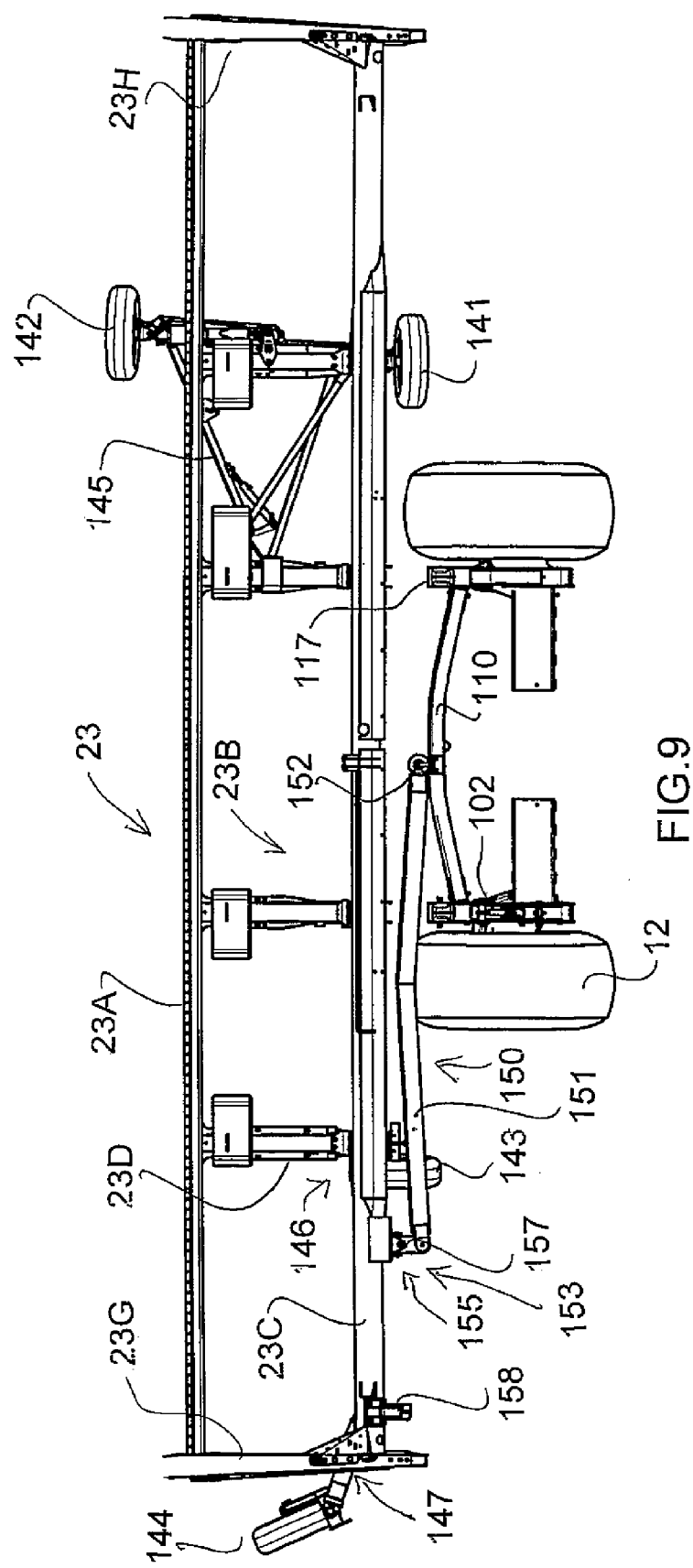
FIG. 9 is a top plan view of the arrangement shown in FIG. 7.
Figure 10:
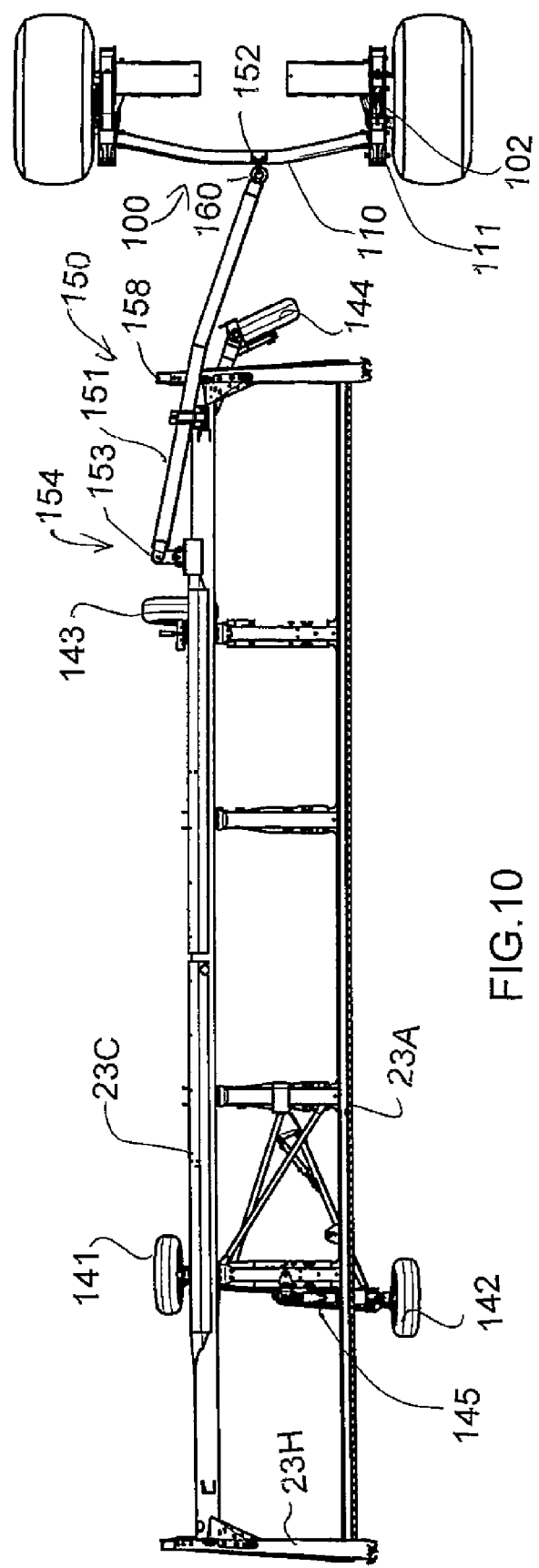
FIG. 10 is a top plan view of the arrangement shown in FIG. 8.
Figure 11:
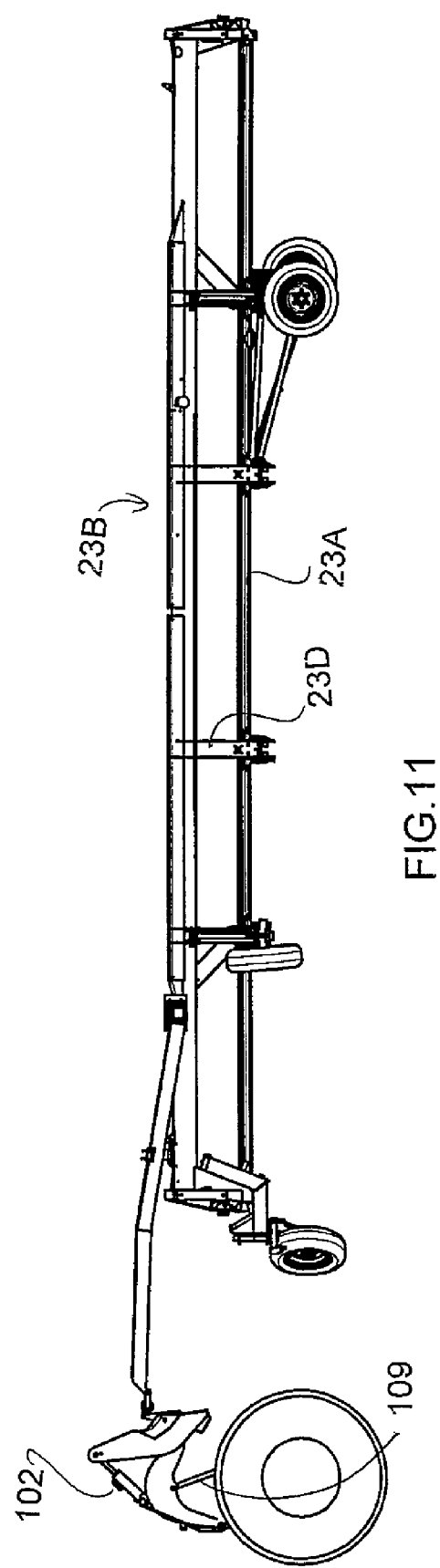
FIG. 11 is a side elevational view of the arrangement shown in FIG. 10.
Figure 12:
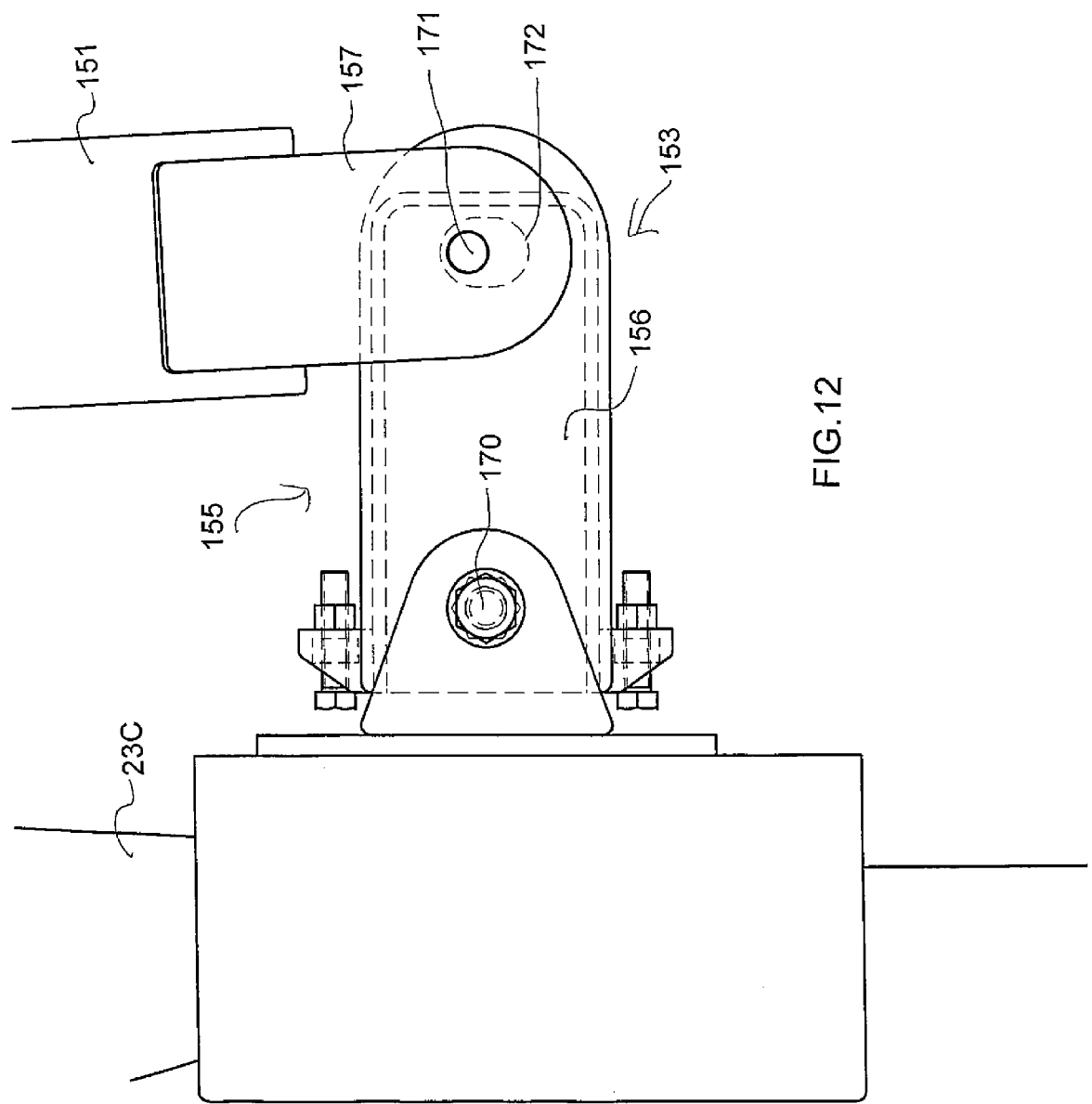
FIG. 12 is a top plan view on an enlarged scale of the coupling shown in FIG. 9 of the hitch arm to the tractor.

In FIGS. 7 and 9 is shown the above described system in the field operating position. For convenience of illustration it will be noted that the ground wheels in the operating position are actually shown in the transport position. However the operation of the wheels will be apparent from the following description Thus the arrangement provides the tractor 10 as described attached to the header 23 as described. As described previously there is provided a disconnect coupling arrangement of the float assembly and header at the connections 115 and 116 to the member 108 for disconnecting the header frame 23B from the lift system 100 for movement of the header frame for disconnection of the header, including the spring float 101, from the tractor or for movement of the header into the transport position shown in FIGS. 8, 10 and 11.

As shown the header frame 23B includes ground wheels 141, 142, 143 and 144 for supporting at least part of the header frame at least in the transport position with some of the wheels also, when required, acting as gauge wheels in the operating position. The wheels 141, 142 and 143 are substantially as described in the above cited U.S. Pat. No. 7,197,865 and operate in the same manner with the distinction being that they are preferably moved automatically by cylinders 145 and 146 for full automation. The wheel 144 is an additional wheel which operates only in the transfer from operating position to transport position and is otherwise raised from the ground by a cylinder 147.

In addition to the connection of the header to the tractor by the float mounting system previously described, there is also provided a linkage 150 in the form of a rigid arm 151 connected at one end 152 to the tractor and at the other end 153 to the frame member 23C of the header.

The linkage 150 is arranged and connected such that in the working position the linkage remains connected to the tractor and the header while allowing the required up and down movement of the header and floating movement of the header relative to the tractor.

In the transport position, with the header disconnected from the mounting system, the linkage arm 151 extends from the tractor to the header for towing the header behind the tractor generally longitudinally of the header with the second end of the tractor forwards.

In the transport position shown in FIG. 8, the linkage 150 in the form, of the arm 151 is connected to the header 23 at a position 154 on the beam 23C thereof adjacent one end 23G of the header and opposite to a trailing end 23H. The linkage extends from the header 23 to the first end of the tractor at the center of the beam 110 of the lift system 100 such that end 23G of the header is trailed behind the end of the tractor at the mounting assembly 100.

In the transport position the linkage arm 151 extends from the position 154 on the header which is spaced inwardly of the end 23G to the position 152 at the tractor which is beyond the end 23G of the header. This ensures that the header is trailed wholly behind the tractor and the front end 23G does not hang out to one side of the tractor. That is the header is moved in the transport position so that it remains at a position located between a path of the first wheels as the tractor moves in a straight line. This is obtained by the arm 151 extending from the rear beam 23C of the header frame to a position beyond the end 23G while being inclined from the rear beam to a position generally midway across the width of the header aligned between the rear wheels 141, 142.

The linkage formed by the arm 151 is rigidly connected to the header to connect the end 23G of the header is supported on the tractor and such that up and down movement of an end of the linkage connected to the tractor causes up and down lifting movement of said one end of the header.

The linkage comprises the rigid arm 151 connected at the end 153 to the header and at the other end 152 to the tractor. The end 152 is formed by a simple ball hitch coupling 160 carried on the beam 110 at the center so that loads from the arm are transferred to the beam 110 and to the driven wheels of the tractor relatively evenly. The end 153 of the arm 151 connected to the header at beam 23C includes a connector member 155 at the header which forms a short arm 156 pivotally connected to the beam 23C for limited pivotal movement about a vertical pin 170 which allows limited side to side movement of the end of the arm 151. The arm 156 is connected to the end of the arm 151 by a coupling 157 including a pin 171 movable in slots 172 so as to provide limited twisting movement of the end of the arm 151 about an axis longitudinal of the arm 156 and generally parallel to the working direction in the operating position to accommodate up and down movement of the header and floating movement of the header relative to the tractor which occurs in the above described operating action.

In the transport position, the arm is rigidly connected to the beam 23C of the header by a fixed receptacle 158 on the beam 23C which locates a point 159 on the arm spaced from the end 153 at a fixed position on the beam 23C of the header. Thus the two points 153 and 159 hold the arm 151 fixed to the beam 23C and extending generally along the beam 23C to the position beyond the end 23G of the header.

The arm 151 is connected to the header beam 23C at the position 153 on the frame of the header which is spaced from the mounting system 100 and spaced from the end 23G of the header. Thus the arm 151 has no effect in the operating position is not in any way involved in supporting the header in the operating position and simply accommodates the movement of the header.

As the arm 151 is connected to the mounting system on the tractor by the ball hitch 160 at the beam 110, it is raised and lowered with the mounting system 100. Thus the header can be raised and lowered at the end 23G by the arm 151 and is supported in the transport position by that arm and by the rear wheels 141, 142.

Thus the ground wheels 141, 142 on the header are located adjacent the end 23H of the header opposite to the arm 151 for supporting a rear end of the header as it is towed behind the tractor, with one of the wheels 141 being located on one side of the header adjacent the frame 23C and the other wheel 142 being located adjacent the cutter bar 23A. As described in the above patent, the wheel 142 located adjacent the cutter bar is moved to a retracted position in the working position of the header so as to cooperate with the wheel 141 and 143 as gauge wheels.

The ground wheels on the header also include the wheel 144 adjacent the end 23G of the header for supporting the end 23G as the header moves from the working position to the transport position. That is, in the movement, the arm 151 is not yet in a position where it can provide the necessary support for the end 23G so that the additional wheel 144 is lowered to the ground to prevent the header from toppling when the mounting to the tractor is disconnected. The wheel 144 then is retracted during transport so that the end 23G of the header is supported by the tractor through the arm 151 as described.

An automatic control switch 250 is provided in the cab which can be operated by the operator to initiate the transfer from transport to working position and vice versa. This switch and the associated control system operates the disconnect mechanism 115, 116 at the coupling between the float system and the arms of the lift system and operates the cylinders 145 and 147. In this way, movement of the header from the transport position to the working position and back including deployment of the ground wheels 142 and 144 by the cylinder 145 and lifting of wheel 143 by the cylinder 147 and including connection and disconnection of the header from the tractor is effected automatically without physical movement of any components by the operator. The physical movement of the header relative to the tractor is obtained simply by guiding the tractor to the required positions to move away from the end 23G to take up the transport position and to move toward the mounting assembly to take up the transport position. The connection of the link arm 151 ensures that the coupling for the transport position is automatically obtained and is maintained so that there is no necessity for the tractor operator to guide the tractor to link up disconnected hitch couplings between the tractor and header.

The invention claimed is:

1. A crop harvesting machine comprising:
    a crop header for cutting a standing crop comprising:
    a cutter extending longitudinally along a front of the header for cutting the crop when the header is moved in a working direction generally at a right angle to its longitudinal direction;
    a crop transport system operable for transporting the crop longitudinally of the header to a center discharge opening at or adjacent a center of the header so as to form a swath for deposit on the ground;
    a swather tractor for moving the header in a working position and in a transport position, the tractor comprising:
        a first end and a second end;
        tractor ground wheels for supporting the tractor in movement across the ground including a pair of transversely spaced first wheels at the first end;
        a mounting system at the first end of the tractor between the header and the tractor for supporting the header in the working position in front of the first end for movement in the working direction;
        the mounting system and the first wheels being arranged to allow the passage of the swath from the central discharge opening between the first wheels;
        the mounting system including a lift construction providing up and down lifting and floating movement of the header relative to the tractor;
        wherein the tractor is drivable in both the working direction with the first end forward and in an opposite direction with the second end forward;
        a disconnect arrangement for disconnecting the header from the working position from the mounting system of the tractor;
        the header including header ground wheels for supporting at least part of the header at least in the transport position;
        and an additional towing linkage connected between the tractor and the header such that in the transport position, with the header disconnected from the tractor at the mounting system, the towing linkage extends from the tractor to the header and tows the header behind the tractor;
        said towing linkage being connected between the tractor and the header while the header is in the working position connected to the tractor by the mounting system;
        wherein the towing linkage extends from the header to the first end of the tractor such that the header in the transport position is towed behind the first end of the tractor as the tractor moves in the opposite direction with the first end at the rear.

2. The crop harvesting machine according to claim 1 wherein the towing linkage is arranged such that the header is moved in the transport position so that the header remains at a position located between a path of the first wheels as the tractor moves in a straight line.

3. The crop harvesting machine according to claim 1 wherein the towing linkage is arranged to remain permanently attached to the tractor and the header while the header is operating in the working position.

4. The crop harvesting machine according to claim 1 wherein the towing linkage is arranged such that in the transport position, with the header disconnected from the tractor at the mounting system, the towing linkage extends from the tractor to a position at or adjacent an end of the header for moving the header longitudinally of the header.

5. The crop harvesting machine according to claim 4 wherein, in the transport position, the towing linkage extends from said position at or adjacent the end of the header to a position beyond the end of the header.

6. The crop harvesting machine according to claim 4 wherein, in the transport position, the towing linkage is rigidly connected to the header such that said end of the header is supported on the tractor and such that up and down movement of an end of the towing linkage connected to the tractor causes up and down lifting movement of said one end of the header.

7. The crop harvesting machine according to claim 1 wherein the towing linkage comprises a rigid arm connected at one end of the arm to the header and at the other end to the tractor and wherein the arm is rigidly connected to the header by a receptacle which locates a point on the arm spaced from said one end at a fixed position on the header.

8. The crop harvesting machine according to claim 7 wherein the rigid arm is connected to the header at a position spaced from the mounting system and spaced from one end of the header.

9. The crop harvesting machine according to claim 1 wherein the towing linkage is connected to the mounting system on the tractor so as to be raised and lowered relative to the tractor with the lift construction of the mounting system.

10. The crop harvesting machine according to claim 9 wherein the towing linkage is connected to the mounting system adjacent a center thereof.

11. The crop harvesting machine according to claim 1 wherein the header ground wheels on the header include at least one wheel adjacent an end of the header which is adjacent to the towing linkage for supporting said adjacent end of the header as the header moves from the working position to the transport position wherein said at least one wheel is retracted during transport so that said adjacent end of the header is supported by the tractor through said towing linkage.

12. The crop harvesting machine according to claim 1 wherein the mounting system includes said lift construction and a spring float system connecting the header to the lift construction so as to allow up and down and floating movement of the header relative to the tractor and wherein the towing linkage includes coupling components which allow in the working position said up and down movement of the header and said floating movement of the header relative to the tractor.

13. The crop harvesting machine according to claim 12 wherein said coupling components include a connector member at the header which allows limited side to side movement of the end of the towing linkage and limited twisting movement of the end of the towing linkage about an axis parallel to the working direction to accommodate, in said working position, said up and down and floating movement of the header relative to the tractor.

14. The crop harvesting machine according to claim 12 wherein the spring float system includes at least one resilient spring which flexes in response to the floating movement and the spring float system includes said disconnect arrangement arranged when disconnected such that the spring float assembly including said at least one resilient spring remains attached to the header.

15. The crop harvesting machine according to claim 1 wherein the tractor includes:
   an engine;
   at least one hydraulic pump driven by the engine for generating a source of hydraulic fluid under pressure for driving components of the tractor and components of the header when attached to the tractor;
   two non-driven castor wheels of the tractor mounted at the second end of the tractor;
   a cab at the first end.

16. The crop harvesting machine according to claim 15 wherein there is provided an operator's seat and control assembly arranged for controlling driving movement of the tractor in both the working direction and the opposite direction, the control assembly including a steering control and a speed control; wherein each of the first wheels including a respective drive motor driven by hydraulic fluid from the at least one hydraulic pump; wherein the speed control is arranged to control a rate of supply of hydraulic fluid from the at least one hydraulic pump to the respective drive motor to control a common speed of rotation of the first wheels and thus a speed of movement of the tractor; and wherein the steering control is arranged to control a differential in rate of supply of hydraulic fluid from the at least one hydraulic pump to the respective drive motor to control a relative speed of rotation of the first wheels and thus a turning direction of the tractor.

17. The crop harvesting machine according to claim 15 wherein the tractor includes an operator seat within the cab and wherein the operator seat is rotatable between a first position facing the first end and a second position facing the second end.

18. A crop harvesting machine comprising:
   a crop header for cutting a standing crop comprising:
      a cutter extending longitudinally along a front of the header for cutting the crop when the header is moved in a working direction generally at a right angle to its longitudinal direction;
      a crop transport system operable for transporting the crop longitudinally of the header to a center discharge opening at or adjacent a center of the header so as to form a swath for deposit on the ground;
   a swather tractor for moving the header in a working position and in a transport position, the tractor comprising:
      a first end and a second end;
      tractor ground wheels for supporting the tractor in movement across the ground including a pair of transversely spaced first wheels at the first end;
      a mounting system at the first end of the tractor between the header and the tractor for supporting the header in the working position in front of the first end for movement in the working direction;
      the mounting system and the first wheels being arranged to allow the passage of the swath from the central discharge opening between the first wheels;
      the mounting system including a lift construction providing up and down lifting and floating movement of the header relative to the tractor;
      wherein the tractor is drivable in both the working direction with the first end forward and in an opposite direction with the second end forward;
      a disconnect arrangement for disconnecting the header from the working position at the mounting system of the tractor;
   the header including header ground wheels for supporting at least part of the header at least in the transport position;
   and an additional towing linkage permanently connected between the header and the mounting system and arranged, in the transport position, to tow the header behind the tractor as the tractor moves in the opposite direction with the first end at the rear.

19. A crop harvesting machine comprising:
   a crop header for cutting a standing crop comprising:
      a cutter extending longitudinally along a front of the header for cutting the crop when the header is moved in a working direction generally at a right angle to its longitudinal direction;
      a crop transport system operable for transporting the crop longitudinally of the header to a center discharge opening at or adjacent a center of the header so as to form a swath for deposit on the ground;
   a swather tractor for moving the header in a working position and in a transport position, the tractor comprising:
      a first end and a second end;
      tractor ground wheels for supporting the tractor in movement across the ground including a pair of transversely spaced first wheels at the first end;
      a mounting system at the first end of the tractor between the header and the tractor for supporting the header in the working position in front of the first end for movement in the working direction;
      the mounting system and the first wheels being arranged to allow the passage of the swath from the central discharge opening between the first wheels;
      the mounting system including a lift construction providing up and down lifting and floating movement of the header relative to the tractor;
      wherein the tractor is drivable in both the working direction with the first end forward and in an opposite direction with the second end forward;

a disconnect arrangement for disconnecting the header from the working position at the mounting system of the tractor;

the header including header ground wheels for supporting at least part of the header at least in the transport position;

and an additional towing linkage permanently connected between the header and the mounting system of the tractor and arranged, in the transport position, to tow the header behind the tractor as the tractor moves in the opposite direction with the first end at the rear.

* * * * *